Figures 1, 2:
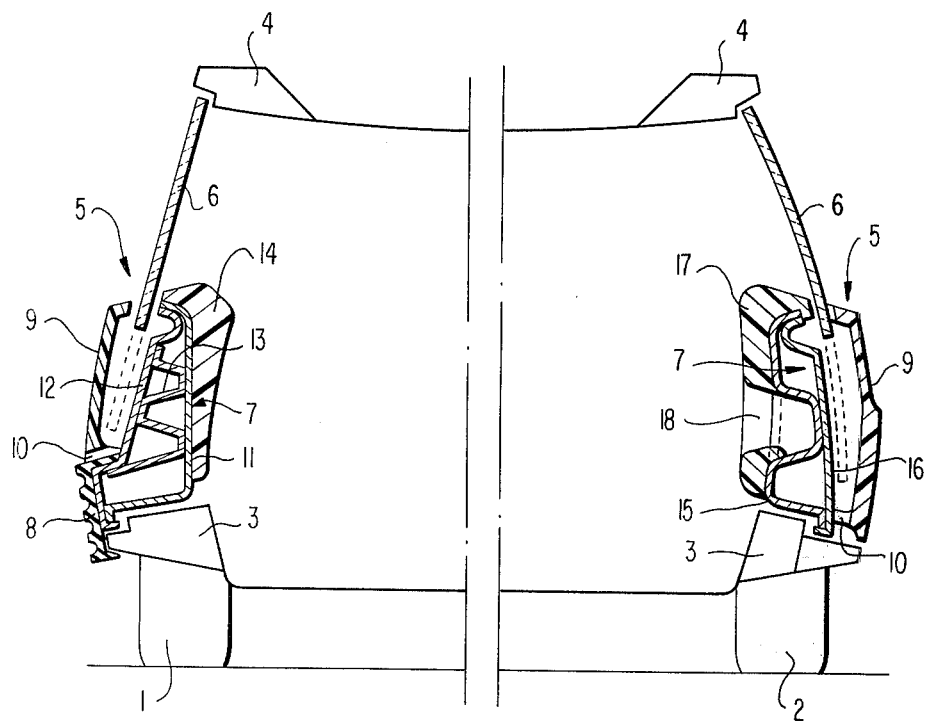

United States Patent
Renner et al.

[11] 3,874,119
[45] Apr. 1, 1975

[54] DOOR FOR VEHICLES, ESPECIALLY PASSENGER MOTOR VEHICLES

[75] Inventors: Hermann Renner, Magstadt; Béla Barenyi, Maichingen, both of Germany

[73] Assignee: Daimler-Benz Aktiengesellschaft, Stuttgart, Germany

[22] Filed: Feb. 15, 1973

[21] Appl. No.: 332,589

[30] Foreign Application Priority Data
Feb. 15, 1972  Germany............................ 2206998

[52] U.S. Cl.................................. 49/502, 296/154
[51] Int. Cl............................................... B60j 5/04
[58] Field of Search............................ 49/501–503, 49/227, 348, 9, 374; 296/154, 146

[56] References Cited
UNITED STATES PATENTS 2,821,429  1/1958  Rantala............................ 296/154 X
3,370,384  2/1968  Hafer et al............................ 49/502
3,730,581  5/1973  Parkinson....................... 296/152 X
3,778,101  12/1973  Tsuda................................ 49/502 X FOREIGN PATENTS OR APPLICATIONS
1,189,810  4/1970  United Kingdom.................. 49/502

Primary Examiner—Kenneth Downey
Attorney, Agent, or Firm—Craig & Antonelli

[57] ABSTRACT

A door for vehicles, especially a side door for passenger motor vehicles, which includes in its upper area a lowerable window and which is provided in its lower area with reinforcements that are disposed on the side of the plane constituted by the guide means of the window facing the vehicle interior space while a shielding member is mounted over the door outside this plane.

23 Claims, 2 Drawing Figures

DOOR FOR VEHICLES, ESPECIALLY PASSENGER MOTOR VEHICLES

The present invention relates to a door for vehicles, especially to a side door for passenger motor vehicles, which includes in its upper area a windowpane adapted to be lowered in the downward direction and which is provided in its lower area with reinforcements.

The recognition has gained acceptance to an ever-increasing extent in the construction and design of modern vehicles that, for safety reasons, the passenger space of motor vehicles or the like has to be constructed deformation stiff and form-rigid. The doors of motor vehicles, especially the side doors, to which one ascribes a decisive significance essentially for the so-called flank protection, entail difficulties in this regard. In particular, when the doors are provided with side windows adapted to be cranked down, which is practically indispensible for reasons of the driving comfort, great difficulties arise in the accommodation of sufficiently large reinforcements. It is known to mount these reinforcements on the outside of the plane formed by the guide means of the windowpane. This leads to an optically non-appealing exterior of the vehicle whereas, on the other, considerable difficulties arise with the water drainage within the area of the doors as well as regards the arrangement of hinges and door locks. There exists the danger that the water penetrates into the reinforcements and leads thereat in hollow spaces to an enhanced corrosion.

The present invention is concerned with the task to construct a door of the aforementioned type as safety-door by the use of a good reinforcement without impairing external appearance of the vehicle. The present invention essentially consists in that the reinforcements are disposed on the side of the plane formed by the guide means of the windowpane facing the vehicle interior space whereas a shielding or protective cover member is mounted on the outside of this plane. This arrangement of the reinforcements does not change the external configuration of the vehicle whereas a space which is present in most vehicles and is not used far-reachingly, is utilized for the accommodation of the reinforcements. A safe water drainage can be realized in a simple manner. Additionally, it is possible to so accommodate the mechanisms for the adjustment of the windowpanes that they are readily accessible after removal of the shielding cover member.

A particularly simple water drainage is obtained in that in an appropriate embodiment of the present invention the shielding cover member is open in the downward direction. Advantageously, the shielding cover member consists of synthetic plastic material, for example, of synthetic resinous material of any conventional type.

According to a further feature of the present invention, provision is made that the reinforcements extend underneath the only partially lowerable pane up to the outer contour of the vehicle.

In order to render the reinforcements safe also in the vehicle interior space, it is advantageous if the reinforcements are at least partially covered on the vehicle interior side with padding of foamed material or the like, such as synthetic resinous foamed material.

In another advantageous embodiment of the present invention, the lower area consists of a completely closed hollow bearer which is composed of one or several sheet metal plates. This hollow bearer can be formed organically and integrally in a simple manner and can be protected against corrosion. Additionally, it is possible thereby to reinforce the hollow bearer internally with one or several additional profiles.

Accordingly, it is an object of the present invention to provide a door for a motor vehicle, especially a side door for a passenger motor vehicle which avoids by simple means the aforementioned shortcomings and drawbacks encountered in the prior art.

Another object of the present invention resides in a door for vehicles which permits the accommodation of sufficiently large reinforcements without impairing the external appearance of the vehicle, thereby permitting the preservation of an aesthetic external configuration of the vehicle.

A further object of the present invention resides in a side door for passenger motor vehicles which permits a simple and reliable water drainage within the area of the door as well as a simple arrangement of the hinges and door locks.

Still a further object of the present invention resides in a side door for a motor vehicle which is highly effective as safety door, yet minimizes the danger of corrosion on the inside of the door.

These and further objects, features and advantages of the present invention will become more apparent from the following description when taken in connection with the accompanying drawing which shows, for purposes of illustration only, two embodiments in accordance with the present invention, and wherein:

FIG. 1 is a somewhat schematic verical cross-sectional view through a side door of one half of a symmetrically constructed passenger motor vehicle in accordance with the present invention; and FIG. 2 is a somewhat schematic vertical cross-sectional view through a modified embodiment of a side door of a symmetrically constructed passenger motor vehicle in accordance with the present invention.

Referring now to the drawing wherein like reference numerals are used throughout the two views to designate like parts, the contour of a passenger motor vehicle is schematically indicated in both figures of the drawing; the passenger motor vehicle includes longitudinal bearers 3 each extending in the respective plane of the tires 1 and 2 and longitudinal bearers 4 within the area of the roof. The space between the longitudinal bearers 3 and 4 is completely taken over in height by a respective side door generally designated by reference numeral 5. This side door consists each of a windowpane 6 and of a hollow bearer generally designated by reference numeral 7 and disposed in the lower area of the door.

The hollow bearer 7 of the embodiment according to FIG. 1 is disposed essentially on the side of the windowpane 6 facing the vehicle interior space or of the planes constituted by the guide means thereof. Since guide means as used in a motor vehicle door for the windows are of conventional construction, they are not shown and described in detail herein. Only in its area closely above the longitudinal bearer 3, the hollow bearer 7 extends up to the outer contour of the vehicle since the windowpane 6 is not completely lowerable. The hollow bearer 7 is then provided externally with a cover profile 8 which extends about the longitudinal bearer 3 and protects the same in this manner against damages. The window guide means disposed in the central area of the door are covered off against the outside by a protective or shielding cover member 9 which extends in this area at a distance to the hollow bearer 7. The protective cover member 9 made preferably of synthetic plastic (resinous) material is provided at the bottom with a gap or apertures 10 so that a completely satisfactory water drainage is assured.

The hollow bearer 7 of the embodiment according to FIG. 1 is composed of two sheet metal members 11 and 12 which are welded together. These sheet metal members 11 and 12 accommodate there between a profile 13 for the further rigidification and reinforcement. On the inside of the vehicle, the hollow bearer 7 is covered off with a padding 14 of conventional foamed material or the like of any known type which is dimensioned thicker in the upper area of the hollow bearer 7 than at the bottom.

In the embodiment according to FIG. 2, the shielding or protective cover member 9 extends over the entire height of the hollow bearer 7 so that it extends up to the top side of the longitudinal bearer 3. This embodiment is suitable for a side window 6 that can be cranked down completely. Also in this embodiment the shielding cover member 9 which is preferably made of synthetic plastic (resinous) material is provided in its lower area with apertures 10 through which the penetrating water can drain off. The hollow bearer 7 is assembled of two sheet metal members 15 and 16 connected with each other by spot welding or the like. The inner sheet metal member 15 is provided with indentations or embossments, by means of which it abuts at the outer sheet metal member 16. In this manner, a map pocket, an arm rest or the like can be formed. The inner sheet metal member 15 is therebeyond covered off by means of a padding 17 which is provided with an aperture 18 within the area of the indentation of the sheet metal member 15.

In both embodiments, the advantage results that the hollow bearers 7 which are constructed very rigid in bending are disposed on the inside of the effective line between the door lock (not shown) and the hinge (not shown).

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A vehicle door comprising
an outer cover means for protecting the outer surface of a vehicle door structure, said outer cover means being open in the downward direction to drain liquid from the interior of the vehicle door structure, and
an inner reinforcement means adapted to project into a vehicle interior to form the inner surface of said vehicle door structure, said inner reinforcement means including at least first and second panel members forming a completely closed hollow bearer reinforcing structure at the interior side of the vehicle door structure,
said outer cover means and said inner reinforcement means being spaced from one another at an upper portion thereof to form a window accommodating means between said outer cover means and said inner reinforcement means.

2. A door according to claim 1, characterized in that said outer cover means consists essentially of synthetic resinous material.

3. A door according to claim 2, characterized in that said inner reinforcement means extend underneath said window accommodating means up to the outer contour of the vehicle.

4. A door according to claim 2, characterized in that said inner reinforcement means are at least partially covered on the vehicle interior side with padding means essentially consisting of foamed material.

5. A door according to claim 4, characterized in that the foamed material is a synthetic resinous foamed material.

6. A door according to claim 4, characterized in that the hollow bearer reinforcing structure is reinforced internally with at least one additional profile means.

7. A door according to claim 4, characterized in that the hollow bearer reinforcing structure is reinforced internally with several additional profile means.

8. A door according to claim 7, characterized in that the door is a side door for a passenger motor vehicle.

9. A door according to claim 7, characterized in that said inner reinforcement means extend underneath said window accommodating means up to the outer contour of the vehicle.

10. A door according to claim 1, characterized in that said inner reinforcement means are at least partially covered on the vehicle interior side with padding means essentially consisting of foamed material.

11. A door according to claim 1, characterized in that the hollow bearer reinforcing structure is reinforced internally with at least one additional profile means.

12. A door according to claim 1, characterized in that the hollow bearer reinforcing structure is reinforced internally with several additional profile means.

13. A door according to claim 1, characterized in that said inner reinforcement means extend underneath said window accommodating means up to the outer contour of the vehicle.

14. A vehicle door structure comprising
an outer cover means for protecting the outer surface of a vehicle door structure,
an inner reinforcing means adapted to project into a vehicle interior to form the inner surface of said vehicle door structure, said inner reinforcing means including at least first and second panel members forming a hollow bearer reinforcing structure at the interior side of said vehicle door structure,
window means formed between said outer cover means and said inner reinforcing means, said window means including a window movable in one of an upward and downward direction between said outer cover means and said inner reinforcing means, and
drainage means for draining liquid from between said outer cover means and said inner reinforcement means.

15. A door structure according to claim 14, wherein said drainage means includes apertures formed at a lower portion of said outer cover means.

16. A door structure according to claim 1, wherein said outer cover means is formed of synthetic resinous material.

17. A door structure according to claim 14, wherein said hollow bearer reinforcing structure is internally reinforced by at least one profile means.

18. A door structure according to claim 17, wherein said inner reinforcing means includes a portion extending below said window means to an outer contour of the vehicle.

19. A door structure according to claim 18, wherein said portion extending below said window means is provided with a profiled cover at the outer contour of the vehicle.

20. A door structure according to claim 14, wherein said window means is open between a top portion of said outer cover means and said inner reinforcing means such that said window passes out of said window means in the upward direction of movement.

21. A door structure according to claim 14, wherein said inner reinforcing means includes an inner sheet metal member facing said vehicle interior, said inner sheet metal member having at least one indentation.

22. A door structure according to claim 21, wherein said inner sheet metal member is covered with padding of foamed material, said padding including an aperture in the area of said indentation.

23. A vehicle door structure comprising
an outer protective cover means, said outer cover means including apertures formed at the lower portion thereof for draining liquid from the vehicle door structure,
an inner reinforcing means adapted to project into a vehicle interior, said inner reinforcing means including an inner sheet metal member facing said vehicle interior, said inner sheet metal member having at least one indentation, wherein said inner sheet metal member is covered with padding of foam material, said padding including an aperture in the area of said indentation, and
window means formed between said outer cover means and said inner reinforcing means, said window means including a window movable in one of an upper and downward direction between said outer cover means and said inner reinforcing means.

* * * * *